(12) United States Patent
Balani et al.

(10) Patent No.: US 11,432,452 B2
(45) Date of Patent: Sep. 6, 2022

(54) VEHICLE SINK ALERT SYSTEM AND METHOD

(71) Applicant: DEERE & COMPANY, Moline, IL (US)

(72) Inventors: Kirti Balani, Maharashtra (IN); Shibinkumar Krishnakumar, Maharashtra (IN); Vishal Rane, Maharashtra (IN)

(73) Assignee: DEERE & COMPANY, Moline, IL (US)

( * ) Notice: Subject to any disclaimer, the term of this patent is extended or adjusted under 35 U.S.C. 154(b) by 885 days.

(21) Appl. No.: 16/259,411

(22) Filed: Jan. 28, 2019

(65) Prior Publication Data

US 2020/0236834 A1 Jul. 30, 2020

(51) Int. Cl.

| | |
|---|---|
| *A01B 76/00* | (2006.01) |
| *A01B 61/00* | (2006.01) |
| *G06Q 50/02* | (2012.01) |
| *A01B 69/00* | (2006.01) |
| *G01C 11/02* | (2006.01) |

(Continued)

(52) U.S. Cl.
CPC .............. *A01B 76/00* (2013.01); *A01B 61/00* (2013.01); *A01B 69/004* (2013.01);
(Continued)

(58) Field of Classification Search
CPC ....... A01B 61/00; A01B 69/004; A01B 76/00; A01B 63/112; A01B 69/001; A01B 63/023; A01B 69/008; A01B 79/005; G06N 20/10; G06Q 50/02; G01C 11/025; G01C 21/20; G01C 21/3602; G01C 11/02; G01C 21/30; G01C 21/34; B60C 23/0408; B60C 23/0477; B60C 23/002; B62D 6/001; B62D 15/0265; B60W 10/30; B60W 30/00; B60W 10/20; B60W 30/10; B60W 30/12; B60W 60/001; G06F 16/29; G05D 1/0246;
(Continued)

(56) References Cited

U.S. PATENT DOCUMENTS

| | | | | |
|---|---|---|---|---|
| 6,064,931 A | * | 5/2000 | Sawada ................. | B60C 23/061 267/140.14 |
| 7,272,474 B1 | * | 9/2007 | Stentz ..................... | G01C 7/04 701/26 |

(Continued)

*Primary Examiner* — Mouloucoulaye Inoussa
(74) *Attorney, Agent, or Firm* — Taft Stettinius & Hollister LLP; Stephen F. Rost (57) ABSTRACT

A vehicle sink alert method and system that includes collecting image data, determining field conditions, calculating wheel sink depth, predicting vehicle sink events using wheel sink depth and field conditions, and activating an alert when a vehicle sink event is predicted. The method can include predicting vehicle sink events using GPS coordinates and historical vehicle sink data. The method can include determining and using vehicle motion to predict vehicle sink events. Predicting vehicle sink events can include forming a multi-dimensional model with positive sink points where vehicle sink events have occurred and negative sink points where vehicle sink events have not occurred; generating a current vehicle point using monitored and calculated data; determining whether the current vehicle point is within a positive sink region formed by the positive sink points; and predicting a vehicle sink event if the current vehicle point is within the positive sink region.

17 Claims, 4 Drawing Sheets

(51) Int. Cl.
*B60C 23/04* (2006.01)
*G06N 20/00* (2019.01)

(52) U.S. Cl.
CPC ........ *B60C 23/0408* (2013.01); *G01C 11/025* (2013.01); *G06N 20/00* (2019.01); *G06Q 50/02* (2013.01)

(58) Field of Classification Search
CPC .... G05D 1/027; G05D 1/0212; G05D 1/0217; G05D 1/0274; G05D 1/0214; G05D 1/0278; G05D 1/0061; G06T 17/05; B60K 35/00; E02F 9/2045; E02F 9/261; B60G 17/018; B60G 17/0165; B60G 17/0195; B60G 17/019
USPC ... 701/1, 26, 28, 514, 36, 41, 85, 71, 37, 79
See application file for complete search history.

(56) References Cited

U.S. PATENT DOCUMENTS

| | | | |
|---|---|---|---|
| 2011/0060478 A1* | 3/2011 | Nickolaou | G01S 17/86 701/1 |
| 2013/0046439 A1* | 2/2013 | Anderson | B60C 23/002 701/36 |
| 2017/0087951 A1* | 3/2017 | Hrovat | B60G 17/018 |
| 2018/0111627 A1* | 4/2018 | Schaffer | B60W 10/04 |
| 2018/0222460 A1* | 8/2018 | Owen | B60W 30/18109 |
| 2019/0129435 A1* | 5/2019 | Madsen | G01C 11/02 |
| 2019/0135262 A1* | 5/2019 | Gaither | B60W 10/119 |
| 2019/0168751 A1* | 6/2019 | Iyengar | B60W 30/12 |

\* cited by examiner

VEHICLE SINK ALERT SYSTEM AND METHOD

FIELD OF THE DISCLOSURE

The present disclosure relates to vehicle monitoring, and more particularly to a system and method that predicts when a vehicle sink event may occur.

BACKGROUND

When vehicles are used off road (for example in agricultural, construction, forestry, and other applications), the wheels can sink in mud, dirt and debris to such an extent that the vehicle can no longer move. This can cause safety issues, cause damage to the area where the vehicle gets stuck, and require significant time and effort to free the vehicle and get it operational again. It is sometimes not obvious by just looking at an area to determine whether it is likely that a vehicle can travel over or work in the area. Also, conditions may change while a vehicle is in an area, or conditions in one section of the area may be different from conditions in another section of the area. When an operator is unfamiliar with an area or is busy with other functions, the operator may not realize that the vehicle is beginning to sink until getting stuck cannot be avoided.

It would be desirable to have a vehicle sink alert system that monitors vehicle parameters and the surrounding area, that predicts when a vehicle sink event is likely to occur based on the monitored data, and alerts the operator when it predicts that a vehicle sink event is likely to occur.

SUMMARY

A vehicle sink alert method is disclosed for a vehicle with wheels in some surroundings. The vehicle sink alert method includes monitoring lateral force exerted on a monitored wheel, collecting image data of the surroundings, monitoring vehicle sensors, calculating a wheel sink depth and field conditions, predicting whether a vehicle sink event is expected and activating an alert device when a vehicle sink event is predicted. Monitoring the lateral force exerted on a monitored wheel uses a force sensor coupled to the monitored wheel where the force sensor provides lateral force readings. Collecting image data of the surroundings uses a camera. The vehicle sensors provide vehicle parameter readings, including vehicle speed readings. Calculating a wheel sink depth for the monitored wheel uses the lateral force readings and the vehicle speed readings. Calculating field conditions uses the image data. Predicting whether a vehicle sink event is expected uses the calculated wheel sink depth and the calculated field conditions. The method can also include monitoring Global Positioning System (GPS) coordinates of the vehicle using a GPS sensor; retrieving historical vehicle sink data with associated GPS coordinates for each historical vehicle sink event; and predicting whether a vehicle sink event is expected also using the GPS coordinates and the historical vehicle sink data. The method can also include determining vehicle motion using the image data, vehicle throttle position readings and vehicle gear position readings; and predicting whether a vehicle sink event is expected also using the determined vehicle motion. The method can also include calculating a wheel sink depth change for the monitored wheel using current and previous values of the calculated wheel sink depth; and predicting whether a vehicle sink event is expected also using the wheel sink depth change.

Predicting whether a vehicle sink event is expected can include forming a multi-dimensional data model with positive sink data points where a historical vehicle sink event has occurred and negative sink data points where a historical vehicle sink event has not occurred; generating a current vehicle data point using the calculated wheel sink depth, the calculated field conditions, the GPS coordinates and the historical vehicle sink data; determining whether the current vehicle data point is inside a positive sink region formed by the positive sink data points or outside the positive sink region; and predicting a vehicle sink event is expected if the current vehicle data point is inside the positive sink region. Determining whether the current vehicle data point is inside or outside the positive sink region can include estimating a boundary separating the positive sink data points and the negative sink data points; determining that the current vehicle data point is inside the positive sink region when the current vehicle data point is on the same side of the boundary as the positive sink data points; and determining that the current vehicle data point is outside the positive sink region when the current vehicle data point is not on the same side of the boundary as the positive sink data points.

The method can also include determining whether a current vehicle sink event is occurring at the current vehicle data point using the image data, the vehicle throttle position readings and the vehicle gear position readings. The method can also include adding the current vehicle data point to the multi-dimensional data model as an additional positive sink data point if the current vehicle data point is inside the positive sink region or a current vehicle sink event is occurring at the current vehicle data point; and adding the current vehicle data point to the multi-dimensional data model as an additional negative sink data point if the current vehicle data point is not inside the positive sink region and a current vehicle sink event is not occurring at the current vehicle data point.

Calculating a wheel sink depth for the monitored wheel can include detecting a submerge time when the lateral force readings for the monitored wheel increase above a typical range; detecting an emerge time when the lateral force readings for the monitored wheel decrease back to the typical range; calculating an elapsed time from the submerge time to the emerge time; calculating a submerged circumference for the monitored wheel based on the elapsed time and the vehicle speed readings; and calculating the wheel sink depth for the monitored wheel based on the submerged circumference for the monitored wheel.

A vehicle sink alert method is disclosed for a vehicle with wheels and vehicle sensors in some surroundings where the vehicle sink alert method includes receiving vehicle parameter readings from the vehicle sensors; calculating a wheel sink depth for a monitored wheel using the vehicle parameter readings; receiving image data of the surroundings from a camera; calculating field conditions using the image data; predicting whether a vehicle sink event is expected using the calculated wheel sink depth and the calculated field conditions; and activating an alert when a vehicle sink event is predicted. The method can also include receiving GPS coordinates of the vehicle; retrieving historical vehicle sink data with associated GPS coordinates for each historical vehicle sink event; and predicting whether a vehicle sink event is expected also using the GPS coordinates and the historical vehicle sink data. The method can also include calculating a wheel sink depth change for the monitored wheel using current and previous values of the calculated wheel sink depth; and predicting whether a vehicle sink event is expected also using the wheel sink depth change.

A vehicle sink alert system is disclosed for a vehicle that has vehicle sensors and wheels. The vehicle sink alert system includes a force sensor, a camera, a vehicle interface, a controller and an alert device. The force sensor is configured to be coupled to a monitored wheel of the vehicle, to monitor lateral force on the monitored wheel and to provide lateral force readings. The camera is configured to collect image data. The vehicle interface is configured to communicate with the vehicle sensors to provide vehicle speed readings. The controller is configured to calculate wheel sink depth based on the lateral force readings and the vehicle speed readings, and to calculate field conditions based on the image data. The controller is also configured to predict whether a vehicle sink event is expected based on the calculated wheel sink depth and field conditions, and to activate the alert device when a vehicle sink event is predicted. The vehicle sink alert system can also include a GPS sensor configured to monitor vehicle location and provide GPS readings; and a memory configured to store historical vehicle sink data with associated GPS coordinates for each historical vehicle sink event; where the controller is configured to predict whether a vehicle sink event is expected based also on the GPS readings and the historical vehicle sink data. The vehicle interface can also be configured to provide vehicle throttle position readings and vehicle gear position readings; the controller can also be configured to determine vehicle motion and to determine whether a current vehicle sink event has occurred at the current vehicle location based on the image data, the vehicle throttle position readings and the vehicle gear position readings; and the controller can also be configured to predict whether a vehicle sink event is expected based also on the determined vehicle motion. The controller can also be configured to access a multi-dimensional data model that includes positive sink data points where a historical vehicle sink event has occurred, negative sink data points where a historical vehicle sink event has not occurred, and a boundary that separates the positive sink data points from the negative sink data points; to generate a current vehicle data point from current monitored and calculated data; and to predict whether a vehicle sink event is expected based on whether the current vehicle data point is or is not on the side of the boundary with the positive sink data points. The controller can also be configured to add the current vehicle data point to the multi-dimensional data model as an additional positive sink data point if the current vehicle data point is on the side of the boundary with the positive sink data points or a current vehicle sink event has occurred at the current vehicle data point; and the controller can also be configured to add the current vehicle data point to the multi-dimensional data model as an additional negative sink data point if the current vehicle data point is not on the side of the boundary with the positive sink data points and a current vehicle sink event has not occurred at the current vehicle data point.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

A tractor sink alert system can use data from multiple sensors in a machine learning approach to predict the possibility of a tractor sinking. A prediction model, for example a support vector machine (SVM), can be built using the sensor data and then the prediction model can be used, as well as improved and refined, as more data is collected during run time. The initial stage of building the model can be supervised, and then the built model can be used and continue learning during run time.

Figure 1:
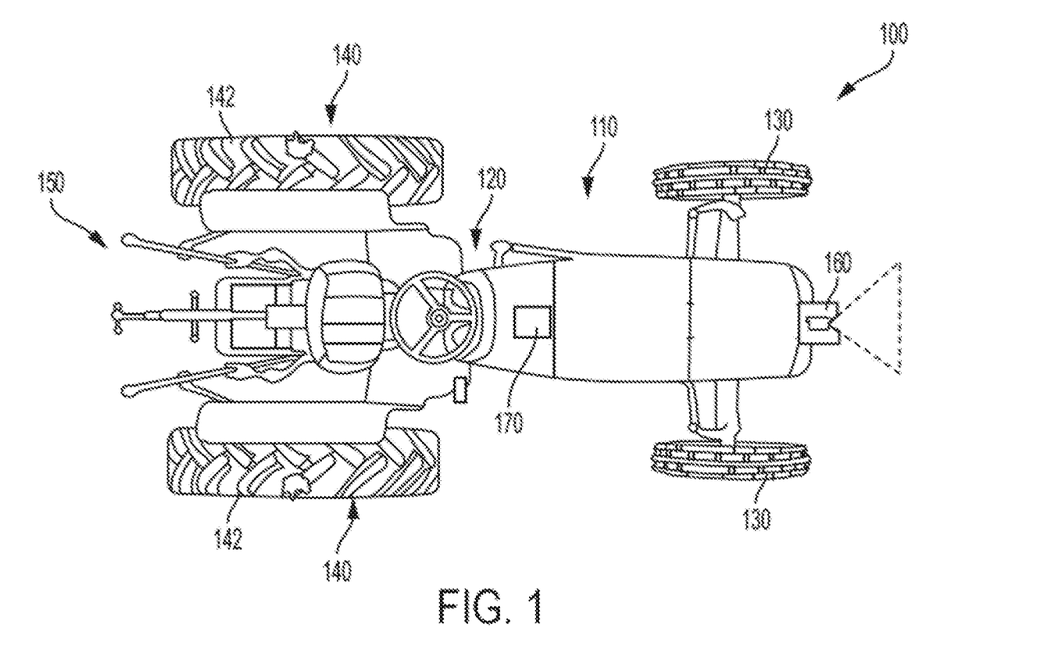
FIG. 1 illustrates an exemplary vehicle, a tractor, for a vehicle sink alert system.

FIG. 1 illustrates an exemplary embodiment of a tractor 100 that includes a body 110, operator controls 120, front wheels 130, rear wheels 140 and an implement connector 150. A tire 142 is mounted on each of the rear wheels 140. A camera sensor 160 can be attached to the tractor 100, for example at the front of the body 110, to provide data to the tractor sink alert system. A Global Positioning System (GPS) sensor 170 can also be attached to the tractor 100 to provide location data to the tractor sink alert system.

Figure 2:
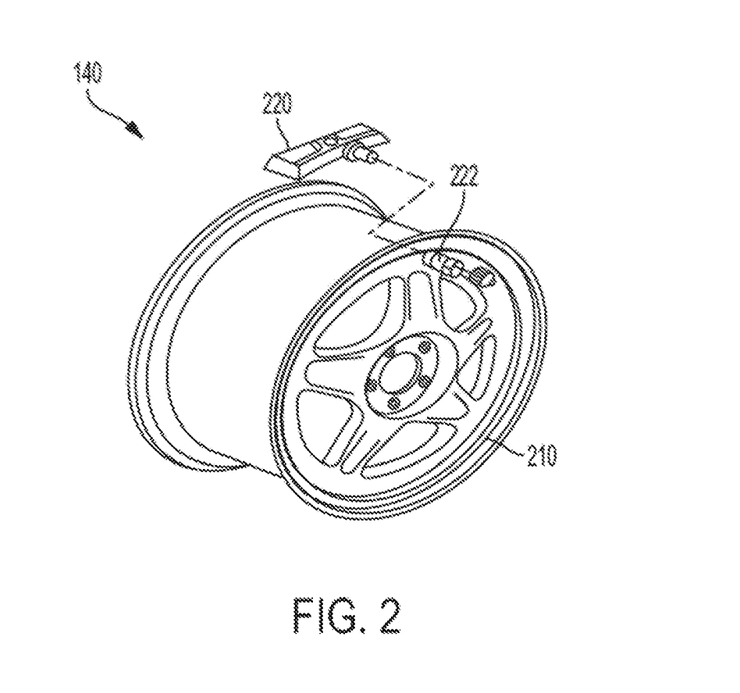
FIG. 2 illustrates a perspective view of a rear wheel of the vehicle with the tire removed to show an exemplary pressure sensor.

FIG. 2 illustrates a perspective view of a rear wheel 140 and rim 210, with the tire 142 removed to show an exemplary pressure sensor 220 with a valve 222. The pressure sensor 220 can be mounted on the rim 210 inside the tire 142 to monitor tire air pressure within a tire 142 mounted on the rim 210.

Figure 3:
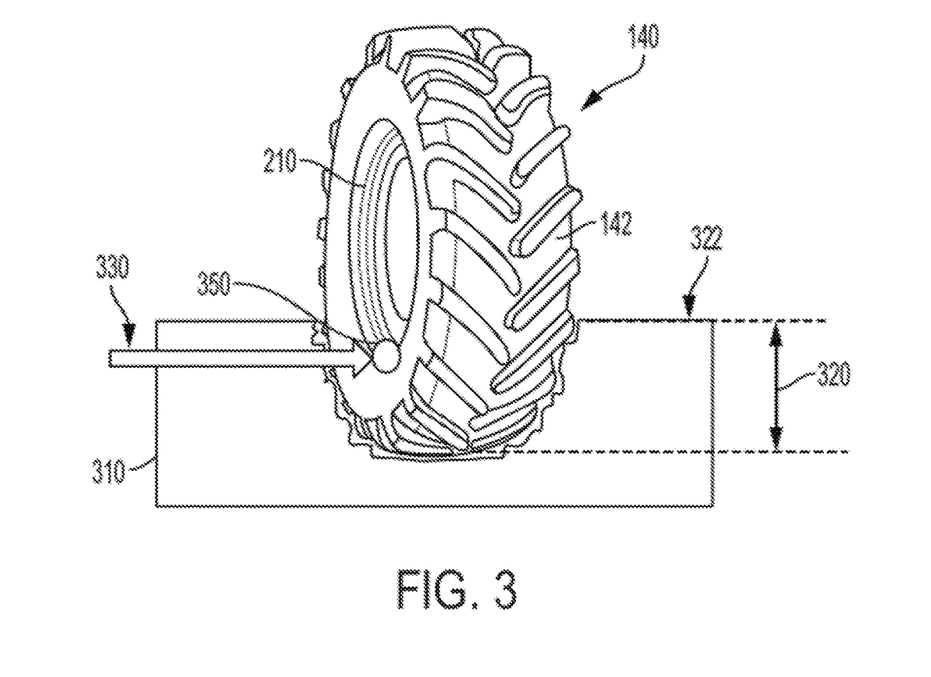
FIG. 3 illustrates one of the rear wheels submerged in mud, where the rear wheel includes a submersible pressure or force sensor.

FIG. 3 illustrates one of the rear wheels 140 that includes a submersible force sensor 350 submerged in mud 310. The force sensor 350 mounted outside of the wheel 140 measures a lateral force exerted on the wheel 140. As illustrated in FIG. 3, when the wheel 140 is submerged to a submerged depth 320 below ground level 322 the force sensor 350 measures a lateral force 330 (represented by arrow 330) exerted on the wheel 140 and tire 142 by the mud 310 and any other factors. The submerged depth 320 of the rear wheel 140, and the lateral force 330 exerted on the wheel 140 and tire 142 can be calculated using sensor readings from the submersible force sensor 350.

Figure 4A:
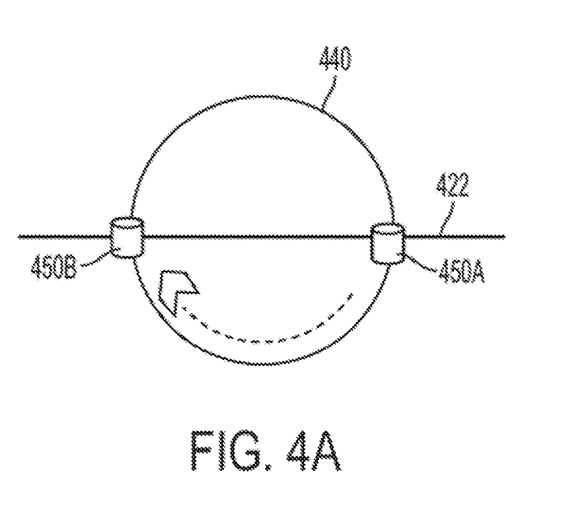
FIGS. 4A and 4B illustrate an exemplary way to calculate the submerged depth of a wheel.
Figure 4B:
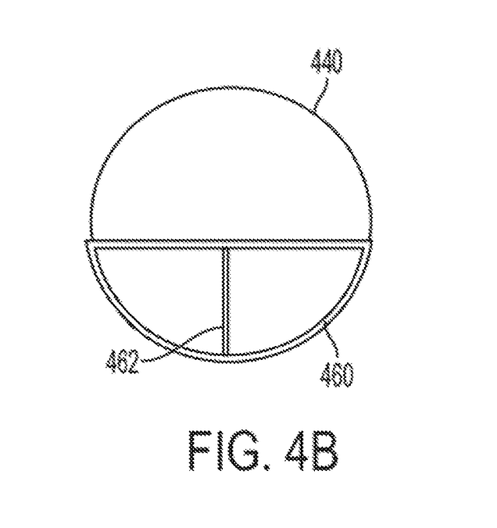

An exemplary way to calculate the submerged depth 320 of the wheel 140 is illustrated in FIGS. 4A and 4B. FIG. 4A shows a circle 440 which represents the wheel 140, a line 422 which represents the ground level 322, and a sensor 450 near the perimeter of the wheel 140 which represents the submersible sensor 350. As the wheel 440 rotates, the sensor 450 moves from position 450A, where it submerges below ground level 422, to position 450B, where it emerges back above ground level 422. By knowing the circumference of the wheel 440, the rotation speed of the wheel 440, and the length of time the sensor 450 was submerged (time to move from position 450A to position 450B), the submerged circumference 460 of the wheel 440 can be calculated. The submerged circumference 460 equals the tractor velocity (which can be monitored using a speedometer or tachometer) times the time for the sensor 450 to move from position 450A to position 450B (which can be estimated by the time during which the sensor 450 detects increased lateral force). FIG. 4B shows the wheel 440 and the submerged circumference 460 of the tire. The submerged depth 462 of the wheel 440 can be estimated as proportional to the submerged circumference 460 of the wheel 440. When half the wheel 440 is submerged, the submerged depth is r and the submerged circumference is $\pi \times r$, where r is the radius of the wheel 440. Thus, the actual submerged depth 462 can be estimated by:

submerged depth 462=submerged circumference 460×(r/(π×r))

Figure 5:
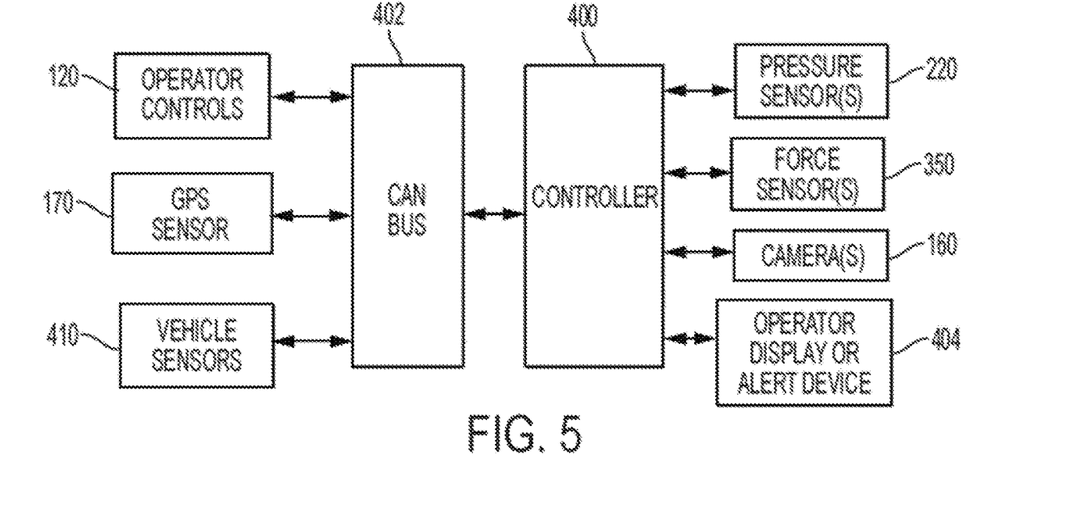
FIG. 5 illustrates an exemplary controller network for the tractor.

FIG. 5 illustrates an exemplary controller network for the tractor 100. The controller network can include a vehicle controller 400 that is coupled to a controller area network (CAN) bus 402. The vehicle controller 400 sends and receives information over the CAN bus 402 to/from the operator controls 120, the GPS senor 170 and various vehicle sensors 410 (which can include, e.g., tachometer, speedometer, gear position, etc.). The vehicle controller 400 can also send and receive information to/from the tire pressure sensor(s) 220, the force sensor(s) 350 and the camera(s) 160. An operator alert device or display 404 can also be coupled to the controller 400 to display status and notifications to the operator. Using data on the CAN bus 402, the vehicle speed, engine speed, throttle position and gear position can be monitored. The combination of these and other metrics can be used as a measure to calculate the tire resistance against muddy fields. For example, for a given throttle, gear position and engine speed, the vehicle speed may lag based on field conditions.

Field data can be determined from field conditions detected using the camera sensor 160. For example, the field conditions can be wet, dry, flooded, flat, hilly, rocky, etc. The camera sensor 160 can be, for example, a 720p resolution analogue camera. Using simple image processing techniques, for example color segmentation or semantic segmentation, a field condition can be determined and then using a learning model, for example SVM, field data can be interpreted from the field condition.

GPS Data can also be collected using the GPS sensor 170 mounted on the vehicle 100. The GPS position along with the field condition and field data can also be saved and used as an additional input to the sink prediction model. Historical GPS data, for example locations where a tractor sink has previously occurred, can be useful for determining the possibility of a current tractor sink event. Knowing the field condition, field data and other factors associated with the GPS data, can also be useful for the sink prediction model.

The data collected from the various vehicle sensors can be used to form a machine learning model which predicts future outcomes. The learning can be broken down into three phases: offline learning, run time learning, and run time sink prediction.

Figure 6:
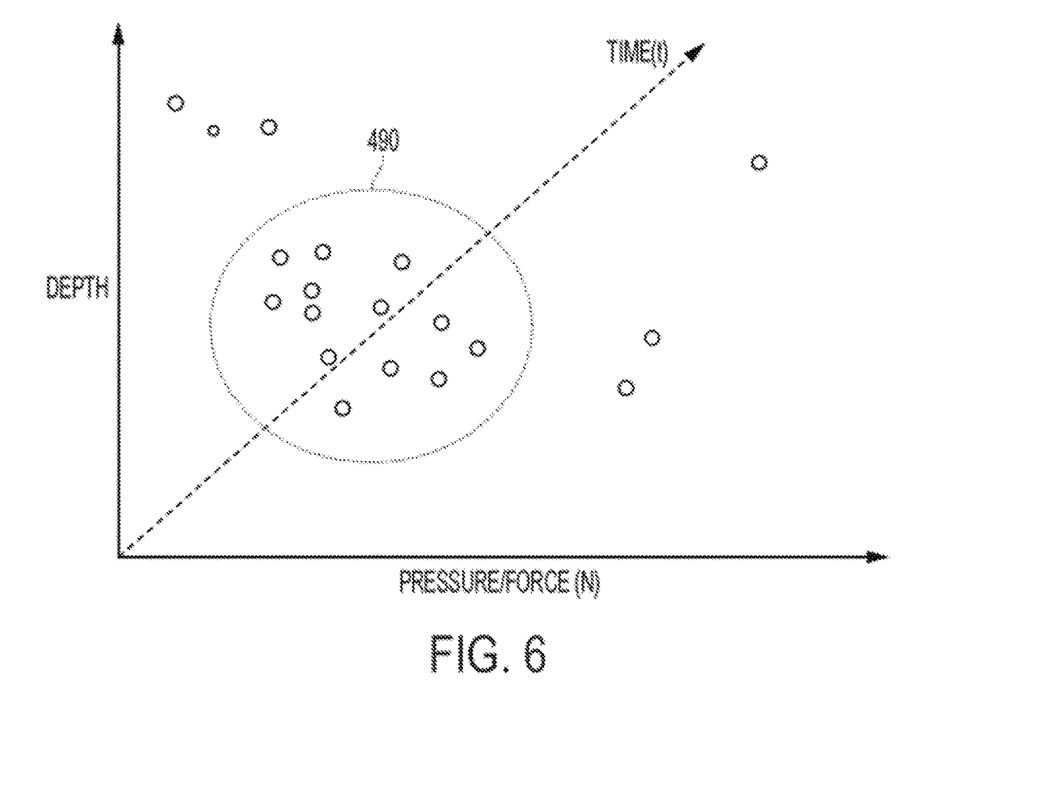
FIG. 6 illustrates an example of data points collected for three-dimensions of the multi-dimensional data model.

The offline learning is a process were an initial sink prediction model is formed by collecting data under varying field conditions. A high dimensional data model can be formed and visual identification and labelling of data points can be done. The data points can be labeled as positive sink (when a tractor sink occurs) and negative sink (when a tractor sink does not occur). A linear SVM model can be formed based on this offline data. FIG. 6 illustrates a simplified example of data points collected for three-dimensions of the multi-dimensional data model. The three dimensions of pressure/force (x-axis), time (y-axis) and depth (z-axis) are shown. The cluster of points enclosed in the boundary 490 represent positive sink data points, and the points outside the boundary 490 represent negative sink data points. Thus, when run time data is collected and the current tractor point is within the boundary 490 a positive sink can be predicted. FIG. 6 represents a simplified three-dimensional sink prediction model with a generally spherical boundary, whereas in an actual sink prediction model each data point would typically have several additional dimensions associated with it (for example those discussed herein), and the boundary 490 would typically have a more complex, higher-dimensioned contour.

The run time learning process can be used to improve and refine the sink prediction model to increase accuracy as more and more data is collected. This run time learning can function as a type of feedback process which uncovers discrepancies between actual results versus predicted results. For example, the sink prediction model can predict a negative sink when an actual tractor sink occurs. The collected data for this sink detection can then be incorporated into the sink prediction model to improve the accuracy of the sink prediction model.

During the run time learning process, actual data can be used to detect whether the tractor is actually moving or not given the throttle position and gear position. If the tractor is not moving when the throttle position is not zero and the gear position is forward or reverse, the system can detect that a tractor sink event has occurred. In addition or alternatively, a tractor sink event can be determined using the throttle position, gear position, and the camera sensors, where the cameras can detect movement or no movement of the vehicle using simple optical flow techniques used in image processing. Differences and agreements between the predicted result by the sink prediction model and the actual result of whether a tractor sink event occurred can be used to refine the sink prediction model.

Run time sink prediction predicts whether a positive sink event is likely based on current sensor and other data fed into the sink prediction model, and activates an alert to the user when a positive sink event is predicted. The data vector used for prediction can include the following metrics with the following exemplary units:

1. Tire submerged depth in meters (dp)
2. Tire pressure in psi (p)
3. Vehicle Speed in meters/sec (sv)
4. Engine speed in meters/sec (se)
5. Throttle analog value (th)
6. Gear position depicting 3 states (Forward 0, Reverse 1, Neutral 2) (gp)
7. Change in tire submerged depth (d(dp)/dt)
8. Change in tire pressure (d(p)/dt)
9. Current GPS data
10. Historical GPS data (field condition) based on current location
11. Field data (Field condition: Dry, moist, wet, flooded)

Figure 7:
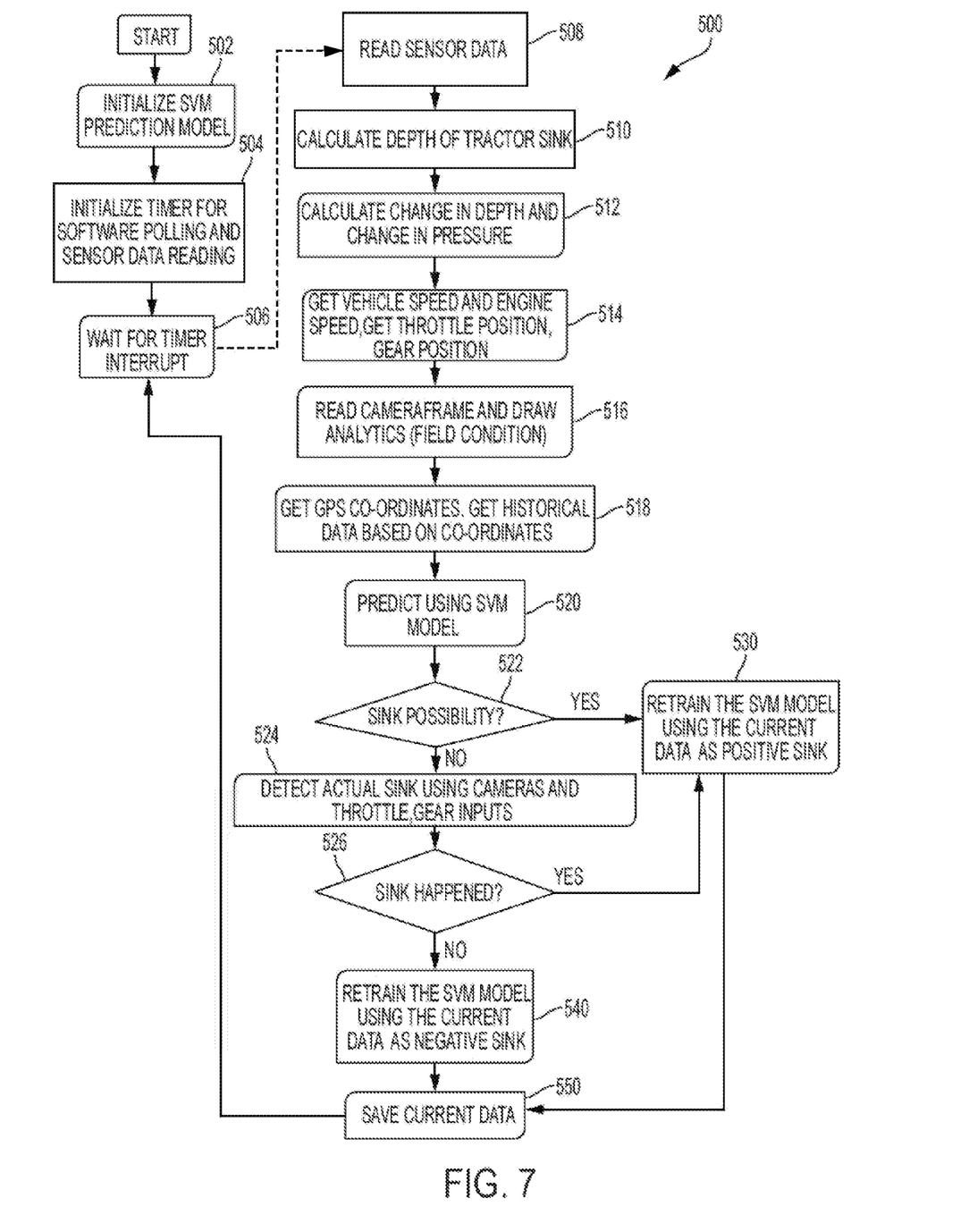
FIG. 7 illustrates an exemplary flow diagram for a sink prediction model and real time learning process.

FIG. 7 illustrates an exemplary flow diagram for a sink prediction model and real time learning process. At block 502, a SVM prediction model is initialized identifying the data vector to be used for the sink prediction model. At block 504, a timer is initialized for software polling of the sensor data readings. At block 506, the system waits for the timer to expire and cause an interrupt. When the timer expires, control passes to block 508 where data is read from the various sensors including the pressure sensor(s) 220 and force sensor(s) 350. The frequency at which the sensor data is read can be configured based on the conditions encountered and other factors.

At block 510, the depth of tractor sink is calculated based on the data from the sensors. At block 512, the change in depth and change in lateral force or pressure is calculated. At block 514, various vehicle parameters are collected, for example vehicle speed, engine speed, throttle position and gear position. At block 516, the camera data is collected and analyzed, including determining field conditions. At block 518, the GPS coordinates of the vehicle position are collected, and historical data is retrieved based on the GPS coordinates. At block 520, the sink prediction model makes a sink prediction based on the collected and calculated data. At block 522, if the model predicts a vehicle sink event control passes to block 530, and if the model does not predict a vehicle sink event control passes to block 524.

At block 524, the collected data, for example, camera, throttle and gear data, are used to determine if an actual sink event occurred. At block 526, if an actual sink event occurred control passes to block 530, and if an actual sink event did not occur control passes to block 540.

At block 530, the sink prediction model is retrained using the current data as a positive sink. If a vehicle sink event is predicted or detected, a visual and/or audible alert or notification can be activated. Control passes from block 530 to block 550.

At block 540, the sink prediction model is retrained using the current data as a negative sink. Control passes from block 540 to block 550.

At block 550, the current data is saved, and control passes back to block 506 to await the next timer interrupt.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle sink alert method for a vehicle in a surroundings, the vehicle having a plurality of wheels, the vehicle sink alert method comprising:
   monitoring lateral force exerted on a monitored wheel of the plurality of wheels using a force sensor coupled to the monitored wheel, the force sensor providing lateral force readings;
   collecting image data of the surroundings using a camera;
   monitoring vehicle sensors providing vehicle parameter readings, the vehicle parameter readings including vehicle speed readings;
   calculating a wheel sink depth for the monitored wheel using the lateral force readings and the vehicle speed readings;
   calculating field conditions using the image data;
   monitoring vehicle location;
   retrieving historical vehicle sink data with associated vehicle sink locations for each historical vehicle sink event; and
   predicting whether a vehicle sink event is expected using the calculated wheel sink depth, the calculated field conditions, the monitored vehicle location and the historical vehicle sink data; and
   activating an alert device when a vehicle sink event is predicted;
   wherein predicting whether a vehicle sink event is expected comprises:
   forming a multi-dimensional data model comprising positive sink data points where a historical vehicle sink event has occurred and negative sink data points where a historical vehicle sink event has not occurred;
   generating a current vehicle data point using the calculated wheel sink depth, the calculated field conditions, the monitored vehicle location and the historical vehicle sink data;
   determining whether the current vehicle data point is inside a positive sink region formed by the positive sink data points or outside the positive sink region; and
   predicting a vehicle sink event is expected if the current vehicle data point is inside the positive sink region.

2. The vehicle sink alert method of claim 1:
   wherein monitoring vehicle location comprises monitoring Global Positioning System (GPS) coordinates of the vehicle using a GPS sensor;
   wherein the associated vehicle sink locations for each historical vehicle sink event comprises associated GPS coordinates for each historical vehicle sink event; and
   wherein predicting whether a vehicle sink event is expected further uses the GPS coordinates.

3. The vehicle sink alert method of claim 1, further comprising:
   determining vehicle motion using the image data and the vehicle parameter readings, the vehicle parameter readings further including vehicle throttle position readings and vehicle gear position readings; and
   wherein predicting whether a vehicle sink event is expected further uses the determined vehicle motion.

4. The vehicle sink alert method of claim 3, further comprising:
   calculating a wheel sink depth change for the monitored wheel using current and previous values of the calculated wheel sink depth;
   wherein predicting whether a vehicle sink event is expected further uses the wheel sink depth change.

5. The vehicle sink alert method of claim 1, wherein determining whether the current vehicle data point is inside or outside the positive sink region comprises:
   estimating a boundary separating the positive sink data points and the negative sink data points;
   determining that the current vehicle data point is inside the positive sink region when the current vehicle data point is on the same side of the boundary as the positive sink data points; and
   determining that the current vehicle data point is outside the positive sink region when the current vehicle data point is not on the same side of the boundary as the positive sink data points.

6. The vehicle sink alert method of claim 1, the vehicle parameter readings further including vehicle throttle position readings and vehicle gear position readings; and the method further comprising:
   determining whether a current vehicle sink event is occurring at the current vehicle data point using the image data, the vehicle throttle position readings and the vehicle gear position readings.

7. The vehicle sink alert method of claim 6, further comprising:
   adding the current vehicle data point to the multi-dimensional data model as an additional positive sink data point if the current vehicle data point is inside the positive sink region or a current vehicle sink event is occurring at the current vehicle data point; and
   adding the current vehicle data point to the multi-dimensional data model as an additional negative sink data point if the current vehicle data point is not inside the positive sink region and a current vehicle sink event is not occurring at the current vehicle data point.

8. The vehicle sink alert method of claim 1, wherein calculating a wheel sink depth for the monitored wheel comprises:
   detecting a submerge time when the lateral force readings for the monitored wheel increase above a typical range;
   detecting an emerge time when the lateral force readings for the monitored wheel decrease back to the typical range;
   calculating an elapsed time from the submerge time to the emerge time;
   calculating a submerged circumference for the monitored wheel based on the elapsed time and the vehicle speed readings; and
   calculating the wheel sink depth for the monitored wheel based on the submerged circumference for the monitored wheel.

9. A vehicle sink alert method for a vehicle in a surroundings, the vehicle having a plurality of wheels and a plurality of vehicle sensors, the vehicle sink alert method comprising:
   receiving vehicle parameter readings from the plurality of vehicle sensors;
   calculating a wheel sink depth for a monitored wheel of the plurality of wheels using the vehicle parameter readings;
   receiving image data of the surroundings from a camera;
   calculating field conditions using the image data;
   predicting whether a vehicle sink event is expected using the calculated wheel sink depth and the calculated field conditions; and
   activating an alert when a vehicle sink event is predicted;
   wherein predicting whether a vehicle sink event is expected comprises:
      forming a multi-dimensional data model comprising positive sink data points where a historical vehicle sink event has occurred and negative sink data points where a historical vehicle sink event has not occurred;
      generating a current vehicle data point using current vehicle parameters;
      determining whether the current vehicle data point is inside a positive sink region formed by the positive sink data points or outside the positive sink region; and
      predicting a vehicle sink event is expected if the current vehicle data point is inside the positive sink region.

10. The vehicle sink alert method of claim 9, further comprising:
   receiving Global Positioning System (GPS) coordinates of the vehicle;
   retrieving historical vehicle sink data with associated GPS coordinates for each historical vehicle sink event; and
   wherein predicting whether a vehicle sink event is expected further uses the GPS coordinates and the historical vehicle sink data.

11. The vehicle sink alert method of claim 10, further comprising:
   calculating a wheel sink depth change for the monitored wheel using current and previous values of the calculated wheel sink depth;
   wherein predicting whether a vehicle sink event is expected further uses the wheel sink depth change.

12. The vehicle sink alert method of claim 9, further comprising:
   determining vehicle motion using the image data and the vehicle parameter readings, the vehicle parameter readings including vehicle throttle position readings and vehicle gear position readings; and
   determining whether a current vehicle sink event is occurring at the current vehicle data point using the image data, the vehicle throttle position readings and the vehicle gear position readings.

13. The vehicle sink alert method of claim 12, further comprising:
   adding the current vehicle data point to the multi-dimensional data model as an additional positive sink data point if the current vehicle data point is inside the positive sink region or a current vehicle sink event is occurring at the current vehicle data point; and
   adding the current vehicle data point to the multi-dimensional data model as an additional negative sink data point if the current vehicle data point is not inside the positive sink region and a current vehicle sink event is not occurring at the current vehicle data point.

14. A vehicle sink alert system for a vehicle that includes a plurality of vehicle sensors and a plurality of wheels, the vehicle sink alert system comprising:
   a force sensor configured to be coupled to a monitored wheel of the plurality of wheels, to monitor lateral force on the monitored wheel and to provide lateral force readings;
   a camera configured to collect image data;
   a vehicle interface configured to communicate with the plurality of vehicle sensors to provide vehicle speed readings;
   a controller configured to calculate wheel sink depth based on the lateral force readings and the vehicle speed readings, and to calculate field conditions based on the image data; and
   an alert device;
   wherein the controller is configured to predict whether a vehicle sink event is expected based on the calculated wheel sink depth and field conditions, and to activate the alert device when a vehicle sink event is predicted; and
   wherein the controller is configured to access a multi-dimensional data model that includes positive sink data points where a historical vehicle sink event has occurred, negative sink data points where a historical vehicle sink event has not occurred, and a boundary that separates the positive sink data points from the negative sink data points; to generate a current vehicle data point from current monitored and calculated data; and to predict whether a vehicle sink event is expected based on whether the current vehicle data point is or is not on the side of the boundary with the positive sink data points.

15. The vehicle sink alert system of claim 14, further comprising:
- a Global Positioning System (GPS) sensor configured to monitor vehicle location and provide GPS readings; and
- a memory configured to store historical vehicle sink data with associated GPS coordinates for each historical vehicle sink event;
- wherein the controller is configured to predict whether a vehicle sink event is expected based also on the GPS readings and the historical vehicle sink data.

16. The vehicle sink alert system of claim 15, wherein:
- the vehicle interface is further configured to provide vehicle throttle position readings and vehicle gear position readings;
- the controller is further configured to determine vehicle motion and to determine whether a current vehicle sink event has occurred at the current vehicle location based on the image data, the vehicle throttle position readings and the vehicle gear position readings; and
- the controller is configured to predict whether a vehicle sink event is expected based also on the determined vehicle motion.

17. The vehicle sink alert system of claim 14, wherein the controller is configured to add the current vehicle data point to the multi-dimensional data model as an additional positive sink data point if the current vehicle data point is on the side of the boundary with the positive sink data points or a current vehicle sink event has occurred at the current vehicle data point; and
- the controller is configured to add the current vehicle data point to the multi-dimensional data model as an additional negative sink data point if the current vehicle data point is not on the side of the boundary with the positive sink data points and a current vehicle sink event has not occurred at the current vehicle data point.

* * * * *